United States Patent Office 3,271,135
Patented Sept. 6, 1966

3,271,135
GOLD RECOVERY PROCESS USING AN ALKALI METAL HYDROSULFITE WITH A WATER SOLUBLE OXYGEN CONTAINING COMPOUND
Charles Davidoff, 118 Rollinghill Road, Manhasset, N.Y.
No Drawing. Filed Dec. 26, 1963, Ser. No. 333,717
6 Claims. (Cl. 75—106)

This invention relates to a method for recovering gold, and more particularly to a method for recovering gold from a solution of alkali metal gold cyanide.

It is common knowledge that solutions of gold cyanide complex, usually in the form of potassium or sodium gold cyanide, exist in several fields of industry from which the gold must be recovered for obvious reasons of economy. Thus, in the mining industry, a widely employed method of recovering gold from ore containing the same involves leaching the gold from the ore with an aqueous solution of alkali metal cyanide, a solution of sodium or potassium gold cyanide being thereby obtained. For plating with gold, the most widely used plating solutions are solutions of sodium or potassium gold cyanide, from which solutions, either new, excess or used, the gold must be recovered. Also, a method of recovering gold from gold alloys such as scrap jewelry and the like involves treatment thereof with an aqueous solution of alkali metal cyanide.

In contrast to the many well established simple procedures for recovering gold from its uncomplexed ionic state such as trivalent gold, no really satisfactory method exists for recovering gold from its alkali metal cyanide complex. According to one presently employed procedure, the solution of gold cyanide complex is first treated, as by vacuum, to remove free oxygen which is needed in conjunction with the alkali metal cyanide to dissolve the gold but which interferes with the subsequent precipitation with zinc. The deoxygenated solution is then treated with zinc dust, usually for several hours and preferably overnight, to precipitate the gold and form a gold-zinc slurry. A small amount of lead acetate is usually added to help coagulate the gold-zinc slurry. The slurry is then filtered, the filter cake is treated with acid to dissolve out the zinc and lead, and the mixture filtered again and the gold filter cake washed free of acid. According to a further improvement on this involved process, and to purportedly diminish or eliminate the need for preliminary deoxygenation of the pregnant solution, the zinc dust is first treated with alkali bisulfite and desirably, alkali metal cyanide but this improvement obviously fails to eliminate the disadvantages of this process inherent in its overlong duration, plural filtrations, need for acid-proof equipment, etc. Further, any lead precipitated with the gold must be completely removed to prevent embrittlement of the gold. Similar considerations apply when this zinc precipitating process is employed for treating the so-called acid gold plating solutions containing the gold cyanide complex buffered with an organic acid such as citric or acetic acid or their ammonium or other alkaline salts to maintain a pH at or below 7.

It is an object of this invention to provide a process for recovering gold from solutions of gold cyanide complex which will not be subject to one or more of the above disadvantages. Another object of this invention is the provision of a new and improved method for recovering gold from such solutions. Still another object of the invention is the provision of such a method which is relatively brief in duration, high in yield, and/or low in cost of labor, materials and/or equipment. A further object is the provision of such a process which may be operated continuously or batchwise as desired. Other objects and advantages will appear as the description proceeds.

The attainment of the above objects is made possible by my method of recovering gold from a solution of alkali metal gold cyanide comprising adding to the solution at least one reducing agent selected from the group consisting of alkali metal hydrosulfite and hydrazine hydrate in a molar amount at least equivalent to the gold in said solution, maintaining the resulting solution at an elevated temperature above about 150° F. until cessation of precipitation of the gold, and removing the precipitated gold from the solution. The above process has been found to constitute a surprisingly simple, economical method of expeditiously recovering gold from solutions of alkali metal gold cyanide in up to 100% yields without the need for the previously required acid-proof equipment.

In carrying out the foregoing process, the attainment of optimum results is ordinarily dependent on proper adjustment, determinable by routine experimentation, of the pH of the solution, proportions of precipitant to gold, temperature and duration of treatment. As a further feature of this invention, I have found that even higher rates of recovery and shorter durations of treatment with less dependence on pH conditions may be obtained by adding to the solution of alkali metal gold cyanide, in addition to one or both of the above-mentioned reducing agents, at least one member selected from the water soluble oxygen-containing group of compounds consisting of aldehydes, hydroxyl-containing amines and their acid salts, ammonium and alkali metal phosphates, hypophosphites and thiosulfates, and amino- and hydroxy-carboxylic acids and their ammonium and alkali metal salts, the combined molar amount of said reducing agent or agents and said member or members being at least equivalent to the gold in said solution, and similarly heating to precipitate the gold.

As only illustrative of operative members of the above-mentioned group of water soluble oxygen-containing compounds there can be employed aliphatic and aromatic aldehydes such as formaldehyde, acetaldehyde, propionaldehyde, glyoxal, dextrose and other carbohydrates, vanillin (4-hydroxy-3-methoxybenzaldehyde), and benzaldehyde sulfonic acid; aliphatic and aromatic hydroxyl-containing amines such as hydroxylamine, methyl-, ethyl-, propyl-, and phenyl-hydroxylamines, mono-, di-, and triethanolamines, and their hydrochlorides and sulfates; ammonium, sodium and potassium hypophosphites, thiosulfates, orthophosphates (including monohydrogen and dihydrogen phosphates), and polyphosphates or molecularly dehydrated phosphates such as the tripolyphosphates, metaphosphates, hexametaphosphates, and pyrophosphates; and aliphatic and aromatic amino- and hydroxy-carboxylic acids such as citric, tartaric, glycollic, hydroxybutyric, hydroxyglutaric, lactic, salicylic, hydroxyphthalic, hydroxyphenylacetic, glycine, alanine, aminoisovaleric, aminovaleric, aminocinnamic, phenylglycine, phenylalanine, phloretic, and ethylenediamine mono-, di-, tri-, and tetra-acetic, and their ammonium, sodium and potassium salts. Certain of the aforementioned members such as the phosphates, hydroxycarboxylic acids and the like may already be present in the gold cyanide solution as a result of previous addition thereto for buffering or other purposes, and it will be understood that such previous addition, in conjunction with the aforementioned reducing agents as employed in the process of this invention, is included within the scope of the invention. Further, the invention includes the use of substances which liberate the additive precipitants described above in the gold cyanide solution. Thus, combinations of sodium hydrosulfite and formaldehyde or acetaldehyde may be effectively added as, respectively, sodium formaldehyde sulfoxylate and sodium acetaldehyde sulfoxylate.

The process of my invention has been found to be highly effective in selectivity precipitating gold in substantially pure and readily filterable form from alkali metal gold cyanide solutions containing such other base metals or contaminants also dissolved therein as copper, zinc, nickel, lead, and platinum and the like. Such solutions, as described above, are formed in the cyanide treatment of gold-containing ores and alloys, and in electroplating processes employing the gold cyanide complex. By way of example, solutions of this type are formed in the porous cup technique for electrolytically dissolving gold-base metal alloys according to which the alloy is used as anode in an electrolyte of alkaline cyanide such as sodium or potassium cyanide while the cathode is shielded by a porous cup to prevent the gold from plating thereon. The resulting electrolyte to be treated by the process of this invention therefore contains dissolved therein the gold, as cyanide complex, and base metals originally present in the alloy. If any slight amounts of such base metals precipitate with the gold, they may be readily leached out by treating the precipitate with acid, if their presence in the recovered gold is prohibited. Any silver present in the gold cyanide solution will be precipitated with the gold by the present process, but can be readily separated from the gold in similar manner, e.g. by leaching the silver from the precipitate with nitric acid. This method of recovering silver from solutions of alkali metal silver cyanide is disclosed and claimed in my copending application Serial No. 333,635 filed on even date herewith entitled "Silver Recovery Process". The silver can of course be allowed to remain with the gold if desired.

In carrying out the process of this invention, the above-described precipitant or mixture thereof is added to the gold cyanide solution in molar proportions relative to the gold in the solution of at least 1:1 up to 15:1 or more, preferably about 2–8:1 and optimally about 3–6:1, optimum results in any particular instance being readily obtained by routine experimentation to determine optimum proportions. It is always preferable to employ an excess of the precipitant, which is relatively inexpensive, to ensure recovery of all the gold in the solution. The rate of precipitation varies directly with the temperature, and for practical purposes, the solution containing the gold cyanide and precipitant should be maintained at elevated temperatures of about 150° F. up to the boiling point, and preferably about 180–200° F. until cessation of precipitation of the gold which may take from about 5 minutes to 2 hours and usually about ¼ to ¾ of an hour.

The precipitant may be added to the gold cyanide solution in dry form or previously dissolved in water, and the process may be carried out batchwise or continuously by metering the precipitant continuously into a flowing stream of the gold cyanide solution, previously heated if desired, in the required proportions, maintaining the stream containing precipitant and gold cyanide at the above-described elevated temperatures for a sufficient time to permit completion of precipitation of the gold, and continuously filtering off the precipitated gold.

The following table shows the percent recovery of gold from various representative alkali metal gold cyanide solutions using the indicated precipitants in accordance with the process of this invention. In each instance, the precipitant or mixture of precipitants is added to 10 cc. of the gold cyanide solution, the resulting mixture maintained at about 180°–200° F. for ½–¾ of an hour, and the precipitated gold filtered off and weighed. All parts and proportions referred to herein and in the appended claims are by weight unless otherwise indicated, and the experiments reported in the table are only illustrative of the invention and not limitative. In the table, the gold cyanide solutions treated have the following substances dissolved therein:

(a)

| | Grams |
|---|---|
| Gold, as potassium gold cyanide | 0.15 |
| Potassium cyanide | 0.08 | pH—10.5.

(b)

| | Grams |
|---|---|
| Gold, as potassium gold cyanide | 0.15 |
| Potassium cyanide | 0.08 |
| Potassium phosphate, dibasic | 0.60 | pH—10.5.

(c)

| | Grams |
|---|---|
| Gold, as potassium gold cyanide | 0.15 |
| Potassium cyanide | 0.08 |
| Potassium hydroxide | 0.15 | pH—14.

(d)

| | Grams |
|---|---|
| Gold, as sodium gold cyanide | 0.15 |
| Sodium cyanide | 0.08 | pH—10.5.

(e)

| | Grams |
|---|---|
| Gold, as sodium gold cyanide | 0.15 |
| Sodium cyanide | 0.08 |
| Sodium phosphate, dibasic | 0.60 |

(f)

| | Grams |
|---|---|
| Gold, as sodium gold cyanide | 0.15 |
| Sodium cyanide | 0.08 |
| Sodium hydroxide | 0.15 | pH—14.

(g)

| | Grams |
|---|---|
| Gold, as potassium gold cyanide | 0.08 |
| Citric acid | 2.00 | pH—3.7.

(h)

| | Grams |
|---|---|
| Gold, as potassium gold cyanide | 0.15 |
| Ammonium citrate | 1.00 | pH—6.5.

In the following table, S.H. means sodium hydrosulfite, S.F.S. means sodium formaldehyde sulfoxylate, S.A.S. means sodium acetaldehyde sulfoxylate, EDTA means ethylene diamine tetra-acetic acid, and Rochelle salts is sodium potassium tartrate.

The results shown in the table illustrate the unexpectedly high yields of recovered gold obtainable by use of the process of the present invention in the treatment of a variety of types of alkali metal gold cyanide solutions representative of those met with in industry. For the most part, yields of 100% of the gold present in the solutions are obtained. Where recoveries of less than 100% are obtained under the conditions shown in the table, it will be understood that such yields may be increased by increasing the amount of precipitant, the temperature, and/or the duration of the treatment. These high yields are indeed surprising in view of the extreme simplicity, economy and rapidity of the present process.

PERCENT RECOVERY OF GOLD

| Precpitant | Gold Cyanide Solution | | | | | | | |
|---|---|---|---|---|---|---|---|---|
| | (a) | (b) | (c) | (d) | (e) | (f) | (g) | (h) |
| 0.5 g. (grams) hydrazine hydrate | | | | | | | | 100 |
| 0.5 g. S.H. | | 90 | | 79 | 62 | | | 65 |
| 0.5 g. S.H.+0.5 g. sodium hypophosphite | 100 | 100 | 100 | | | | 100 | 77 |
| 0.4 g. S.H.+0.1 g. vanillin | | 100 | | | | | | |
| 0.25 g. S.H.+0.25 g. triethanolamine | | | | | | | | 100 |
| 0.5 g. S.H.+0.5 g. triethanolamine | | | | 70 | | | 100 | 100 |
| 0.4 g. S.H.+0.1 g. triethanolamine | 100 | 86 | 100 | 87 | 85 | | 80 | 77 |
| 0.4 g. S.H.+0.1 g. triethanolamine | | [1] 100 | | | | [2] 100 | [3] 100 | [4] 100 |
| 0.5 g. S.H.+0.08 g. disodium phosphate | 100 | | 100 | | | | 100 | |
| 0.5 g. S.H.+0.08 g. sodium phosphate | 100 | | 100 | | | | | |
| 0.5 g. S.H.+0.08 g. trisodium phosphate | 100 | | 100 | | | | | |
| 0.5 g. S.H.+0.08 g. Na4P2O7 | 100 | | 100 | | | | | |
| 0.25 g. S.H.+0.25 g. dextrose | 90 | 100 | | 100 | 100 | | | |
| 0.4 g. S.H.+0.1 g. sodium thiosulfate | | 100 | | | | | | |
| 0.4 g. S.H.+0.1 g. rochelle salts | | 100 | | | | | | |
| 0.25 g. S.H.+0.25 g. EDTA | | 100 | | | | | | |
| 0.4 g. S.H.+0.1 g. EDTA | | 100 | | | | | | |
| 0.5 g. S.H.+0.5 g. hydroxylamine sulfate | 85 | 90 | | 100 | 75 | | | |
| 0.5 g. S.H.+0.5 g. hydrazine hydrate | | | | 100 | | | | |
| 0.25 g. S.H.+0.25 g. hydrazine hydrate | | 100 | | | | | | |
| 0.5 g. S.F.S. | | | | | | | 100 | 100 |
| 0.37 g. S.F.S.+0.37 g. hydrazine hydrate | | | | | | | 100 | 100 |
| 0.74 g. S.F.S.+0.74 g. hydrazine hydrate | 65 | 100 | 100 | 85 | 100 | 100 | 100 | 100 |
| 0.37 g. S.F.S.+0.37 g. EDTA | | | | | | | 100 | 100 |
| 0.25 g. S.F.S.+0.25 g. glycine | | [1] 70 | | | [1] 75 | | [3] 100 | 100 |
| 0.5 g. S.F.S.+0.5 g. glycine | 100 | | 100 | 100 | | 100 | | 100 |
| 0.5 g. S.F.S.+0.5 g. hydroxylamine sulfate | 95 | 85 | [2] 82 | [2] 92 | 78 | [2] 100 | | |
| 0.5 g. S.F.S.+0.25 g. triethanolamine | | | | | | | | 100 |
| 0.5 g. S.F.S.+0.5 g. glycine + 0.5 g. ammon. citrate | | 100 | | | | | 100 | |
| 0.37 g. S.F.S.+0.37 g. hydraz. hydrate +0.17 g. disod. phosphate | | 70 | 77 | | | | [3] 100 | [3] 100 |
| 0.5 g. S.A.S. | | | 60 | | | | 100 | 100 |
| 0.37 g. S.A.S.+0.37 g. rochelle salts | | | | | | | 100 | 100 |
| 0.5 g. S.A.S.+0.5 g. hydroxylamine SO4 | | 100 | | | | | 75 | |

[1] + 0.15 g. KOH.
[2] + 0.60 g. disodium phosphate.
[3] Neutralized with NH4OH or KOH.
[4] + 0.4 g. triethanolamine.

To confirm the selective action of the present process, silver cyanide, copper cyanide and nickel cyanide, separately and in combinations of two and all three thereof, were added to separate 10 cc. portions of a representative plating solution containing 0.15 gram of gold as potassium gold cyanide, 0.08 gram of potassium cyanide, 0.60 gram of potassium phosphate, dibasic, and 0.15 gram of KOH and the gold precipitated therefrom in accordance with the present process using sodium hydrosulfite, sodium formaldehyde sulfoxylate and sodium acetaldehyde sulfoxylate individually as the precipitant. Analysis of the precipitate established that all the gold and silver had been precipitated but none of the copper or nickel.

Results equivalent to those shown in the above table are obtained when potassium is the alkali metal instead of sodium in the hydrosulfite precipitant. When applying the process of this invention for the treatment of alkali metal gold cyanide solutions present in industry as described above, such solutions need no preliminary deoxygenation as ordinarily required with presently employed gold recovery processes. The process is substantially independent of the pH of the solution which may range from about 14 for the highly alkaline solutions down through neutrality to about 3 in the case of solutions buffered with phosphates and/or carboxylic acids such as citric, acetic, etc. Similarly, the process is operative on solutions containing any amount or concentration of alkali metal gold cyanide, the minimum concentration being established in any particular instance by only economic factors; unless dictated by other considerations, gold concentrations so low as to result in the value of the recovered gold being below the cost of the recovery process would ordinarily not justify use of the process. The maximum operative concentration is of course that of a saturated solution.

This invention has been disclosed with respect to certain preferred embodiments, and it will be understood that various modifications and variations will become obvious to persons skilled in the art and are to be included within the spirit and purview of this invention and application and the scope of the appended claims.

I claim:

1. A method of recovering gold from an aqueous solution of alkali metal gold cyanide consisting essentially in adding to the solution alkali metal hydrosulfite and at least one member selected from the group of water soluble oxygen-containing compounds consisting of aldehydes, hydroxyl-containing amines, ammonium and alkali metal phosphates, hypophosphites and thiosulfates, and amino- and hydroxy-carboxylic acids and their ammonium and alkali metal salts in a combined molar amount at least equivalent to the gold in said solution, maintaining the resulting solution at an elevated temperature above about 150° F. until cessation of precipitation of the gold, and removing the precipitated gold from the solution.

2. A method of recovering gold from an aqueous solution of alkali metal gold cyanide consisting essentially in adding to the solution alkali metal hydrosulfite and an alkali metal hypophosphite in a combined molar amount at least equivalent to the gold in said solution, maintaining the resulting solution at an elevated temperature above about 150° F. until cessation of precipitation of the gold, and removing the precipitated gold from the solution.

3. A method of recovering gold from an aqueous solution of alkali metal gold cyanide consisting essentially in adding to the solution alkali metal hydrosulfite and an alkali metal phosphate in a combined molar amount at least equivalent to the gold in said solution, maintaining the resulting solution at an elevated temperature above about 150° F. until cessation of precipitation of the gold, and removing the precipitated gold from the solution.

4. A method of recovering gold from an aqueous solution of alkali metal gold cyanide consisting essentially in adding to the solution alkali metal hydrosulfite and a hydroxyl-containing amine in a combined molar amount at least equivalent to the gold in said solution, maintaining the resulting solution at an elevated temperature above about 150° F. until cessation of precipitation of the gold, and removing the precipitated gold from the solution.

5. A method of recovering gold from an aqueous solution of alkali metal gold cyanide consisting essentially in adding to the solution alkali metal hydrosulfite and formaldehyde in a combined molar amount at least equivalent to the gold in said solution, maintaining the resulting solution at an elevated temperature above about 150° F. until cessation of precipitation of the gold, and removing the precipitated gold from the solution.

6. A method of recovering gold from an aqueous solution of alkali metal gold cyanide consisting essentially in adding to the solution alkali metal hydrosulfite and acetaldehyde in a combined molar amount at least equivalent to the gold in said solution, maintaining the resulting solution at an elevated temperature above about 150° F. until cessation of precipitation of the gold, and removing the precipitated gold from the solution.

References Cited by the Examiner
UNITED STATES PATENTS

| | | | |
|---|---|---|---|
| 545,852 | 9/1895 | De Wilde | 75—106 |
| 1,426,517 | 8/1922 | Salzberger | 75—108 |
| 1,479,542 | 1/1924 | Hirschkind | 75—106 |
| 3,147,154 | 9/1964 | Cole et al. | 75—108 |
| 3,215,524 | 11/1965 | Fetscher et al. | 75—106 |

DAVID L. RECK, *Primary Examiner.*

N. F. MARKVA, *Assistant Examiner.*